United States Patent Office 3,451,893
Patented June 24, 1969

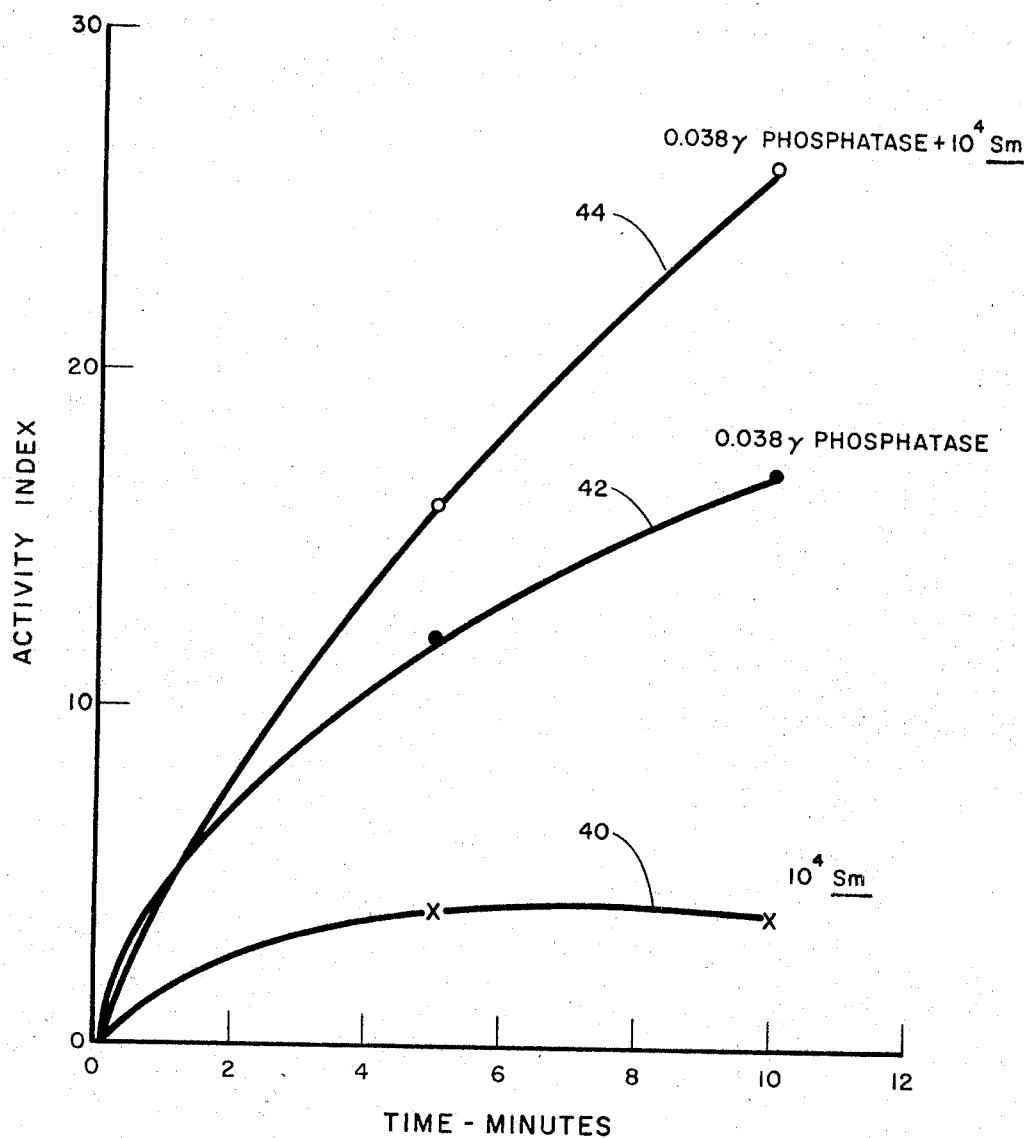

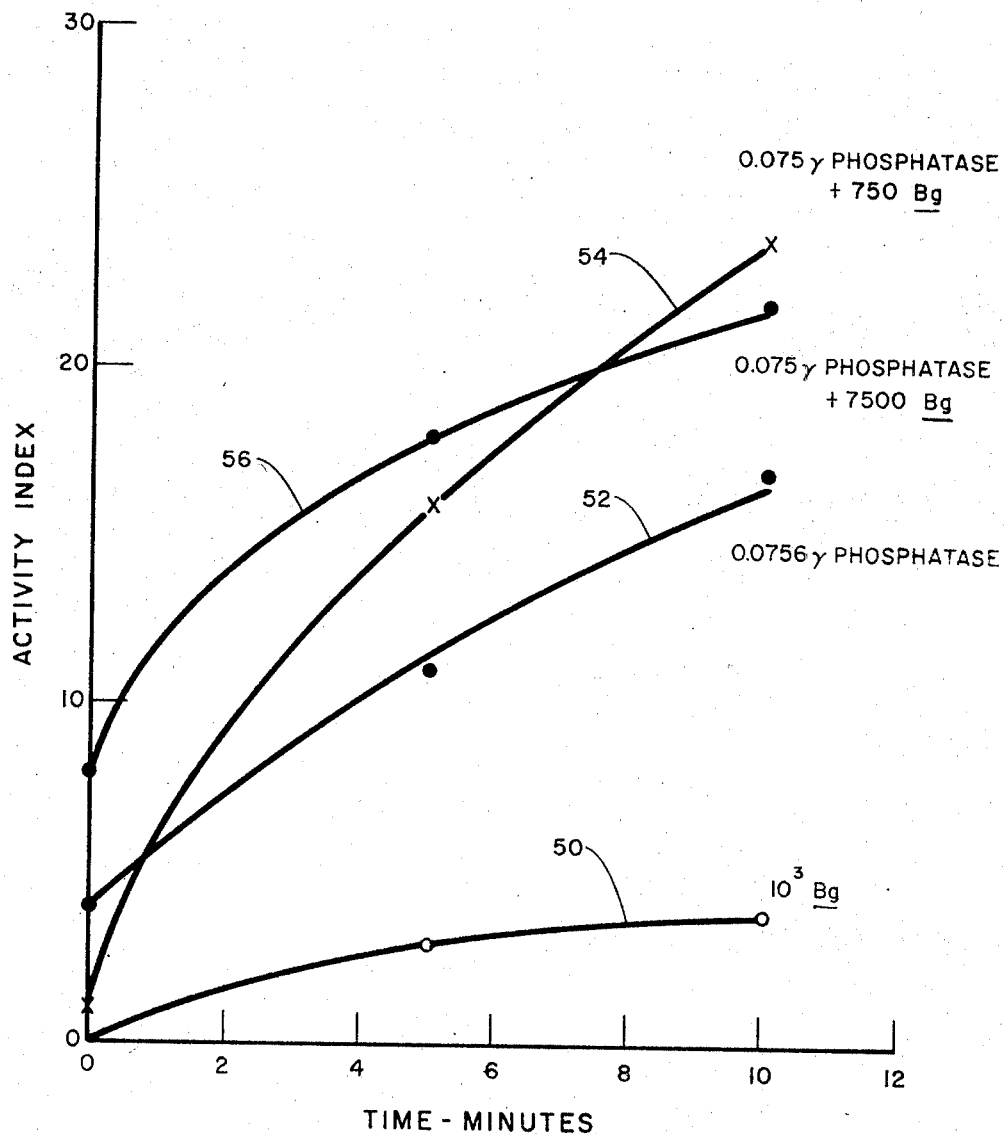

3,451,893
METHOD OF RAPIDLY DETECTING MICROORGANISMS
Robert G. Sanders, Minneapolis, Minn., assignor to Litton Systems, Inc., Beverly Hills, Calif., a corporation of Maryland
Filed Sept. 27, 1966, Ser. No. 582,275
Int. Cl. C12k 1/06, 1/10
U.S. Cl. 195—103.5                        9 Claims

ABSTRACT OF THE DISCLOSURE

A method of rapidly detecting microorganisms by "poising" a mixture of an enzyme and a substrate whereby a given enzyme common to the microorganism is mixed with a selected substrate in predetermined concentrations to provide an equilibrium condition with respect to the production of an enzyme-substrate complex the condition being characterized by the production of minimum amounts of an end product, the microorganism is then added to the enzyme-substrate system to rapidly produce measurable amounts of end product.

---

Figure 1:
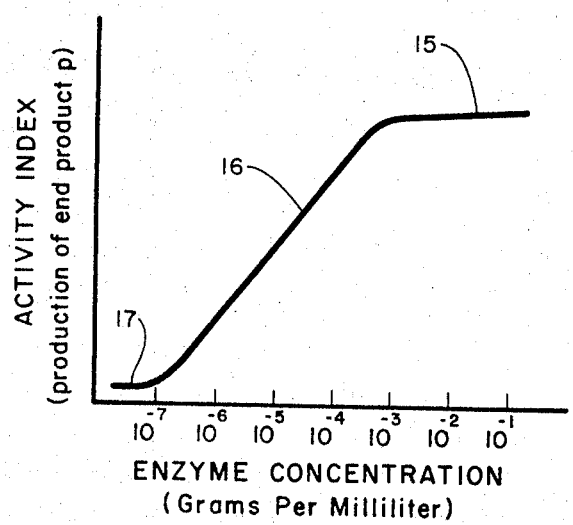

This invention relates to a method of rapidly detecting microorganisms and, in particular, to a rapid method for detecting microorganisms by adding a sample of microorganism to an enzyme-substrate system which is "poised" for rapid response to enzymes present in the microorganism sample.

As industrial manufacturing techniques have become more complex, increasing emphasis has been placed on maintaining industrial clean rooms free from dust and other particles, such as microorganisms. Further, continued emphasis has been placed on maintaining such rooms as hospital operating rooms and medical clinic examination rooms free from microorganisms such as pathogenic bacteria, fungi, rickettsia, and viruses. Much emphasis in providing relatively germ-free atmospheres for such rooms has been directed toward removing aerosols and microorganisms (such as pathogens) from the atmosphere in such rooms. However, an equally important aspect in the maintenance of germ-free atmospheres in such rooms is the detection and monitoring of pathogens in the atmosphere. Of special importance is the provision of facilities for rapidly and sensitively determining the presence of pathogens in the atmosphere in such rooms. Because there has been relatively little necessity for rapid and sensitive detection systems in the past, prior, fairly slow laboratory techniques have been considered adequate and relatively little effort has been expended on the problems of increasing detection speed during the development of scientific bacteriology.

Three basic approaches and combinations thereof may be used to analyze samples for the detection of microorganisms. For example, one can attempt to detect the organism itself, such as a vegetative cell or spore, either microscopically or by standard bacteriological plating and growth techniques. Secondly, one can detect some characteristic constituent of the organisms, such as nucleic acid, protein, lipid, etc. Also, one can attempt to detect something that the organism does, such as hydralyzing gelatin, producing carbon dioxide, etc. The latter category of detection, that is, detecting something that the organism does, is perhaps the easiest and most rapid method of detection.

Standard bacteriological methods are far too time consuming (12–24 hours) for rapid detection. Identifying constituents of microorganisms is both time consuming and entirely non-specific for organisms. Detecting something the organism does is directly related to enzyme constituents in the living cell and is a rapid way of detecting small changes in bacterial population.

Chemical detection methods, such as microbiochemical assays or enzyme detection, are more specific and sometimes diagnostic. Several chemical techniques, such as the catalase test or the presence of indophenol oxidase, are extremely rapid (less than 1 minute). Unfortunately, however, such methods leave much to be desired because they are sensitive only to relatively high microbial concentrations, such as in the range of $10^6$ to $10^9$ organisms per ml. Further, while biological techniques are inherently sensitive and specific, the time involved between sample collection and readout is considerably greater (in the range of 12–24 hours) than that allowable for rapid detection.

Even the most recently developed chemical detection method measuring aerosolized protein suspensions, cannot detect fewer than $10^5$ organisms per liter of air within five minutes. In particular, the background protein in the air is $10^6$ times greater than that of one microorganism per liter of air. Therefore, between $10^5$ and $10^6$ microorganisms must be available for detection, hence, the aerosolized protein suspension detection method is not sensitive enough. Morevore, because changes in the protein concentration in air do not indicate changes in the bacterial concentration, protein concentration is not a reliable measure of bacterial concentration.

Some microbiologists have characterized bacteria as being essentially batteries of enzymes. Most of the biological characteristics and activities of bacteria are derived from the presence of certain enzymes. Thus classical diagnostic bacteriology depends upon the presence or absence of certain enzymes (in addition to morphology and antigenic structure) for specific identification of bacteria. It will be appreciated that microorganisms which may be detected by the present invention utilize enzymes in their basic metabolic processes. For example, exo-enzymes utilized by bacteria are excreted by bacterial cells into their environment where the enzymes decompose certain substrates in the environment. These enzymes are hydrolases which catalyze the hydrolytic decomposition of their nutritive substrates.

Certain enzymes are vital to substantially all microorganisms and especially to pathogens. Thus, the detection of enzymes can be an indication of the presence of microorganisms. However, only in some instances is it possible to determine the actual amount of enzyme by chemical or physical means. Consequently, enzyme content is usually assayed by measuring its activity index. By this procedure, the amount of end-product ($p$) produced in a given time by an enzyme acting on a substrate is an indication of the amount of the enzyme. If the enzyme is derived from microorganisms, the activity index may be correlated with the number of microorganisms present.

It is known that enzyme reactions are extremely rapid. Thus, the turnover number of catalase is $2.5 \times 10^6$ mol substrate/per mol enzyme/per minute; and of alcohol dehydrogenase is $2 \times 10^4$ mol substrate/mol enzyme/minute. However, the rate of reaction is related to the enzyme concentration. Thus, referring now to FIG. 1 of the drawings, a curve 15 illustrates the activity index (measured in terms of the production of end product ($p$)) plotted against enzyme concentration. Such rapid reaction rates are achieved only along the sloping portion 16 of the curve where the concentration of enzyme causing the reaction is in the range of 0.1 microgram/ml. to 1 mg./ml. for unpoised alkaline phosphatase, for example. Because the enzyme concentrations which are of interest in the present invention are significantly below 0.1 microgram/ml., and fall in the lower, flat portion 17 of the curve, the activity index of enzyme concentrations in this flat portion 17 of the curve are immeasurable and are not proportional to enzyme concentration when standard detection methods are used.

Procedures for measuring the enzyme activity index used in the laboratory generally require the addition of an enzyme sample of unknown concentration to a given substrate. The enzyme sample and the substrate are then incubated under controlled conditions for a relatively long time to permit production of the end-product.

Because the speed of detection of microorganisms is usually an inverse function of the number of organisms sensed, rapid detection is assisted by the use of large-volume air samplers which concentrate the particles in a large volume of air into small amounts of liquid. By combining impaction, impingement and electro-static precipitation principles, one can concentrate on a continuous basis airborne biological particles from a high volume air flow into a low volume liquid flow. High collection efficiencies can be obtained by such combination of methods and are capable of collecting particles having size ranges from 0.2 to 10 microns in diameter, at air flow rates from 2800 to 10,000 l./min., concentrating the particles into liquid flow rates of 2 to 10 ml./min. Thus, if the biological organisms which are to be sampled are present at a rate of only 4 organisms per liter of air, operating at 10,000 l./min. such a sampler could collect 40,000 organisms per minute and concentrate them into 10 ml. of liquid each minute so that a sample concentration of $4\times10^3$ organisms per ml. would be achieved. On the other hand, prior-art collectors such as AGI impingers, Casella samplers, etc., would require more than five hours to acquire sufficient organisms for so-called rapid detection.

Research into ways to decrease the time and increase the sensitivity of detection using the enzymatic method of detecting biological organisms indicates that a rapid method of detecting such organisms is to "poise" an enzyme-substrate system by mixing with a substrate that amount of enzyme required to maintain an equilibrium between the enzyme, the substrate and an enzyme-substrate complex produced by the action of the enzyme on the substrate. At this critical equilibrium point in the reaction, the addition of a trace amount of free enzyme to the enzyme-substrate system will cause a sudden shift in the equilibrium and the formation of a substantial detectable amount of end-product. By proper selection of the "poising" amount of enzyme, one can determine the smallest amount of free enzyme effecting the formation of the greatest amount of end-product in the shortest period of time. With such "poised" enzyme-substrate system, minimum concentrations ($10^3$ organisms/ml.) of microorganisms can be detected in about five minutes.

An object of the present invention is to provide a new and improved method of rapidly and sensitively detecting microorganisms by detecting enzymes which are vital to such microorganisms.

Another object of the present invention is to provide a method of poising an enzyme-substrate system in an equilibrium condition and adding thereto microorganisms to be detected, wherein minimum concentrations of enzymes of such microorganisms cause the production of a detectable amount of end-product.

A further object of the present invention is to provide a method of making a "poised" enzyme-substrate system which includes selected amounts of alkaline phosphatase and disodium-phenyl-phosphate for rapidly detecting minute amounts of the enzyme alkaline phosphatase which may be present in microoragnisms to be detected.

With these and other objects in view, the present invention contemplates a significant change in the standard enzyme activity detection procedures in which an enzyme to be detected is added directly to a substrate. In particular, the present invention contemplates using a "poised" enzyme-substrate system. The enzyme-substrate system is formed by combining with a given amount of a substrate, that amount of enzyme required to maintain an equilibrium between the enzyme, the substrate and the enzyme-substrate complex. Rather than adding free enzyme to be detected to only the substrate, the free enzyme is added to the "poised" enzyme-substrate system. When the enzyme-substrate is "poised," the addition of only a trace amount of free enzyme causes a sudden shift in the equilibrium and the formulation of a significant, measurable amount of end product.

A complete understanding of the present invention may be had by referring to the following detailed description and the accompanying drawings illustrating various aspects thereof, wherein FIG. 1 is a graph of activity index plotted against enzyme concentration illustrating the very low, relatively constant rate of formation of an end product at low enzyme concentrations;

FIG. 2 is a graph of activity index plotted against enzyme concentration illustrating a plateau formed when a "poising" amount of enzyme is used;

FIG. 3 is a graph illustrating activity index plotted against reaction time when a "poising" amount of enzyme is used;

FIG. 4 is a graph of activity index plotted against reaction time measuring alkaline phosphatase activity of the microorganism *Serratia marcescens* (Sm) with and without "poising";

FIG. 5 is a graph of activity index plotted against reaction time masuring alkaline phosphatase activity of the microorganisms *Bacillus subtilis* var *niger* (Bg) with and without "poising";

FIG. 6 is a bar graph showing the change in activity level of an enzyme-substrate system which is "poised" for maximum response to organisms in the shortest possible time.

The method of the present invention uses an enzyme-substrate system which is "poised" for rapid response to a minimum amount of enzymes present in microorganisms which are to be detected. Because certain enzymes, such as alkaline phosphatase, for example, are common to all microorganisms, except for Rickettsia and viruses, such enzymes may be used as a constituent of the enzyme-substrate system of the present invention. In particular, the enzyme alkaline phosphatase has been shown to be an excellent enzyme when used as an alkaline phosphatase suspension in ammonium sulfate, such suspension being hereinafter referred to as an "enzyme suspension." The enzyme alkaline phosphatase may be extracted from Type III *E. coli* available from the Sigma Chemical Co., for example.

A substrate illustrating the principles of the present invention is disodium-phenyl-phosphate which is available, for example, from the Applied Research Institute in compressed tablet form under the trade name of "Stabilized Phos-Phax." A suitable preparation of disodium-phenyl-phosphate may be made by dissolving one such tablet in 50 ml. water to yield a concentration of 0.50 mg./ml. of disodium-phenyl-phosphate in 0.0745 M. borate buffer pH 9.6. Such solution of a substrate will hereinafter be referred to as the "substrate solution."

The enzyme suspension and the substrate solution are mixed using selected concentrations of each to provide the "poised" enzyme-substrate system. The selected concentration of enzyme suspension is determined by providing a number of containers, each holding the same given quantity of substrate solution at a given concentration (i.e. 2.5 mg./ml.) which is in excess of that required to react with the enzyme suspension to be added and at the optimum pH (i.e. 9.5) for reaction. To such containers of substrate solution are added equal quantities of enzyme suspension having varying enzyme concentrations. The mixtures are incubated at constant temperature, such as 37° C., for a given time period, such as 30 minutes. The activity index (in terms of the amount of end product produced) is determined at the end of the given time period.

Figure 2:
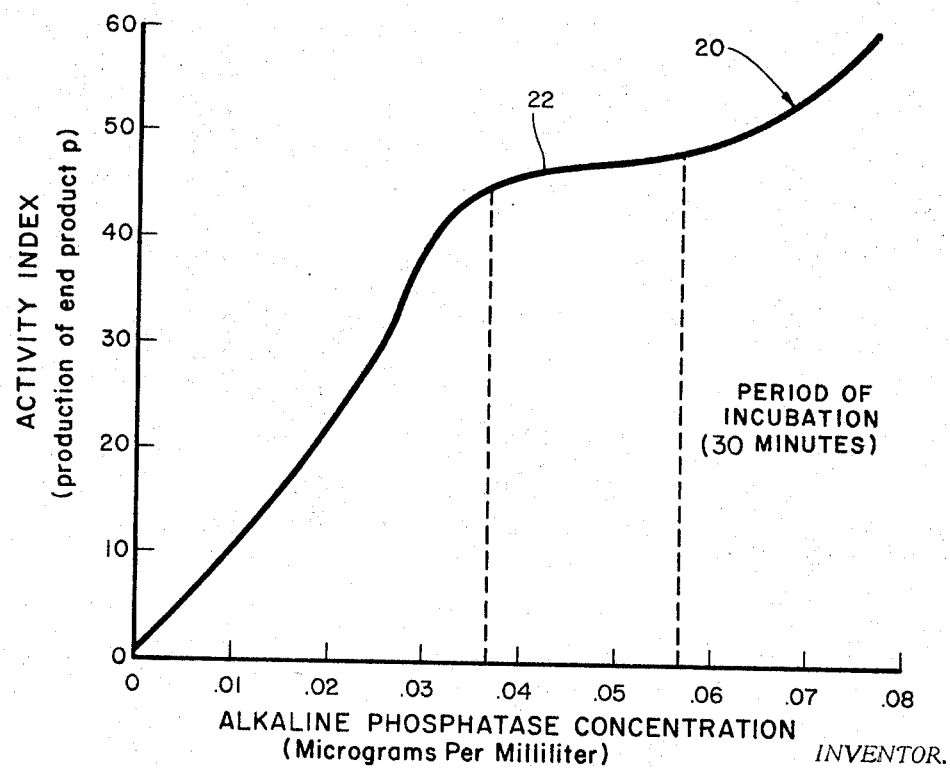

Reference to FIG. 2 will illustrate the results of this procedure. In FIG. 2, there is shown a curve 20 representing the activity index (in terms of end product ($p$) produced during the given incubation period) for various concentrations of alkaline phophatase. As shown in FIG. 2, there is a distinct plateau 22 in the curve 20. In particular, the activity index is relatively constant for alkaline phosphatase concentrations between $3.75 \times 10^{-2}$ and $5.75 \times 10^{-2}$ micrograms per ml.

The significance of the plateau 22 may be appreciated by considering the reaction between the enzyme suspension and the substrate solution.

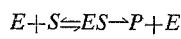

where:

E=enzyme suspension
S=substrate solution
ES=enzyme-substrate complex concentration
P=end product then, where the activity index plateau 22 occurs, the rate of formation of end product (P) is a minimum and the rate of formation of the enzyme-substrate complex (ES) is maximum. This indicates that the enzyme-substrate system is "poised" when enzyme concentrations are between 3.75 and $5.75 \times 10^{-2}$ micrograms per ml.

Figure 3:
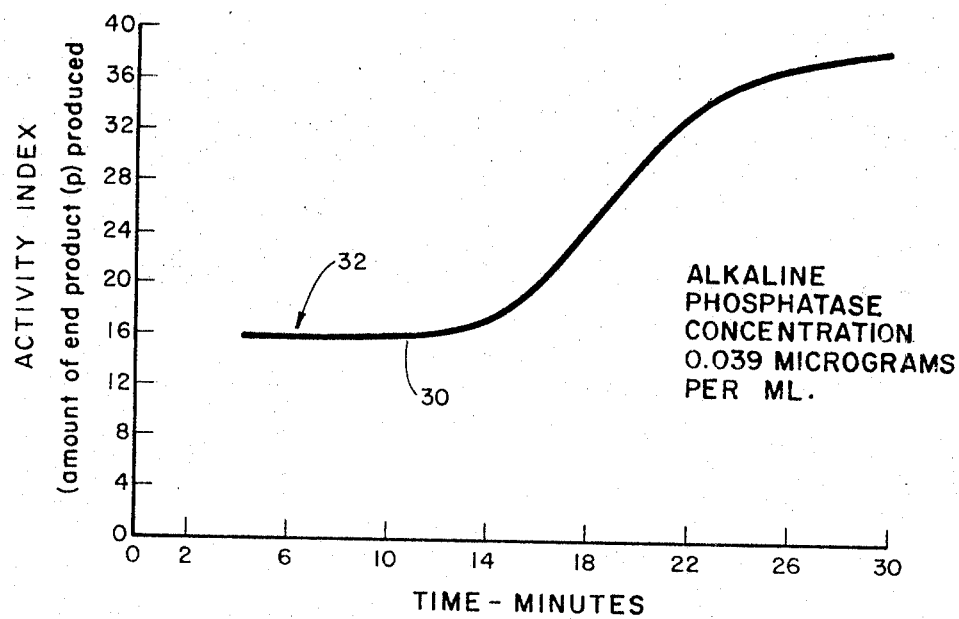

Referring to FIG. 3, a curve 30 illustrates the critical nature of the enzyme concentration-time relationship favorable to the formation of the enzyme-substrate complex (ES). When the enzyme-substrate system having a concentration of 0.039 microgram per ml. of alkaline phosphatase was used, the activity index remained substantially unchanged for 10 minutes along a portion 32 of the curve 30 between 4 and 14 minutes. The activity index then doubled in the next 10 minutes. The curve 30 illustrates optimum conditions for the formation of the enzyme-substrate complex (ES) during the 4 to 14 minute period in which there was no substantial change in the production of end product (P).

When the enzyme-substrate system includes the enzyme alkaline phosphatase and the substrate disodium-phenyl-phosphate, the addition of trace amounts of microorganisms causes the enzyme to hydrolyze the substrate and produce measurable amounts of the end product (P) phenol. The Sharer phosphatase procedure may be used to determine the amount of phenol produced. In this procedure, 2,6-dibromo-quinone-chloroimide (BQC) is added to a container holding the microorganisms and the poised system for reaction with the phenol to produce indophenol, which is blue in color. The intensity of the color, which is proportional to the amount of phenol produced, is quantitatively determined optically by reading in a colorimeter at a wave length of 650 millimicrons.

The standard Sharer procedure requires five minutes at room temperature to develop the blue indophenol color after the addition of the BQC. An aspect of the present invention is the modification of the Sharer method so that the normal time may be substantially reduced without adverse effects on the color formation. The modified Sharer procedure includes placing the container in a boiling water bath. This method causes development of maximum blue color within 15 seconds, rather than 5 minutes. It has been found that this rapid color development is achieved when the water bath temperature is between 95 and 100° C.

The Sharer procedure was used to determine whether or not the end product phenol was produced during the 4 to 14 minute portion 32 of the curve 30 of FIG. 3. The color formed in the 4-minute reaction tube was green, rather than blue, indicating the formation of a compound different from phenol. Spectrophotometric analysis showed that this green colored compound had a distinctly different absorption spectrum. Thus, it is clear that at the level portion 32 of the curve 30 of FIG. 3, there is momentary isolation of the enzyme-substrate complex (ES).

The significance of the plateau in the activity index vs. enzyme concentration curves 15 and 20 of FIGS. 1 and 2 is shown in FIG. 4. Referring to FIG. 4, the activity index (in terms of production of end product (P)) is shown plotted against time for various concentrations of the microbial agent *Serratia marcescens* (Sm). The enzyme-substrate system used in these tests included an enzyme suspension of alkaline phosphatase having a concentration of 0.038 microgram of enzyme per ml. and the substrate solution of disodium-phenyl-phosphate referred to above.

To illustrate the nature of the reaction resulting from only the Sm samples, curve 40 shows the activity index of the Sm samples alone. Curve 40 indicates the activity index to be below 5, hence it is within the range of experimental error and is not reliable.

Also, to illustrate the sensitivity of the poised enzyme-substrate system to the Sm samples, reference is made to curves 42 and 44. Curve 42 shows the activity index of the poised enzyme-substrate system without the Sm samples, whereas curve 44 shows the significantly increased activity index when $10^4$ Sm microbial agents were added to the "poised" enzymephosphatase system. These curves 42 and 44 indicate a significant difference in activity index after 5 and 10 minutes incubation time. This difference is 4 after 5 minutes and 9 after 10 minutes.

In FIG. 5, there are shown a series of curves showing the effect of adding lyophilized cultures of *Bacillus subtilis* var *niger* (Bg) of various concentrations to "poised" and unpoised enzyme systems.

The enzyme-substrate system in this example included the enzyme alkaline phosphatase having a concentration of 0.0756 mg. per ml. Curve 50 illustrates the very low activity index which results from the addition of $10^4$ microorganisms of Bg to unpoised alkaline phosphatase. Curve 52 shows the activity index of the "poised" enzyme-substrate system. The effect of adding 750 Bg organisms to the "poised" enzyme-substrate system is shown in curve 54, whereas the effect of adding 7500 Bg organisms is shown in curve 56. Curves 54 and 56 clearly show that measurable amounts of end product (P) are produced by the "poised" enzyme system when only 750 Bg organisms are being detected as compared to immeasurable amounts of end product (P) which are produced by 1000 Bg organisms added according to prior art techniques to an unpoised substrate (curve 50).

The enzyme-substrate system of the present invention may be formed using the substrate para-nitro-phenyl-phosphate. This substrate is a compound which, upon hydrolysis of the phosphate group by phosphatase, yields the yellow salt of para-nitro-phenol having a characteristic absorption maximum of 400 millimicrons. To prepare a substrate solution using this substrate, one hundred mg. of Sigma 104 para-nitro-phenyl-phosphate substrate is dissolved in 25 ml. of water. Equal parts of this solution and Sigma Alkaline Buffer solution are mixed to produce a substrate solution which may be added to the alkaline phosphatase enzyme suspension to form the enzyme-substrate system.

The "poised" enzyme-substrate system is formed by adding one (1) ml. of the para-nitro-phenyl-phosphate substrate solution to one (1) ml. of the alkaline phosphatase enzyme suspension having an enzyme concentration of between 0.15 and 0.25 microgram per ml. Because the rate of hydrolysis was slow, the para-nitro-phenyl-phosphate substrate is more difficult to "poise" and is less useful than the disodium-phenyl-phosphate.

The step of the present invention relating to collecting a sample of microorganisms can be performed by apparatus such as that disclosed in the J. L. Milton Patent 2,336,625 when the microorganisms are airborne. This apparatus includes an air intake provided with corona discharge points which ionize the microorganisms. The air and microorganisms impact against a film of liquid which flows across a disc which is rotated at a rate of 500 r.p.m., for example. An electric field provided adjacent the disc urges the ionized microorganisms toward the disc and into the flowing liquid.

If microorganisms are present in the air in quantities of 4 organisms per liter of air and if such apparatus takes in 10,000 liters of air per minute, it can collect 40,000 organisms per minute. The liquid flow rate can be adjusted to 10 ml. per minute so that a microorganism sample of $4 \times 10^3$ organisms per minute is collected. This concentration of organisms is well within the rapid detection capability of the present method.

While the type of apparatus disclosed in the Milton patent is suitable for the collection of inorganic matter, such as dust and other airborne particles, certain critical modifications must be made to preclude undesired effects on the viable microorganisms which may be detected by the poised enzyme-substrate system of the present invention.

In particular, the liquid used to collect the microorganisms must not provide a variable level of activity index, but should provide a constant background against which the activity index of the microorganisms may be measured. Moreover, the liquid must adequately wet the collection disc and must be compatible with both the microorganisms to be detected and the phosphatase used in the poised system. Investigation of liquids which meet these requirements indicates that a liquid suitable for collecting microorganisms to be detected is a mixture of water and between 0.1 and 1.0 percent of non-ionic polyoxyethylene-lauryl-ether, such as that sold under the trade name "Brij-35" by the Atlas Chemical Co.

In the use of this liquid, the collection disc may be manually wet with the water mixture, whereafter a liquid input of about 11 ml. per minute is suitable for maintaining the disc wet under an air flow rate of 10,000 l./minute and with standard relative humidity conditions. This mixture does not inhibit the growth of microorganisms, such as Sm and Bg, for example, and does not adversely effect the phosphatase activity of the "poised" system.

Figure 6:
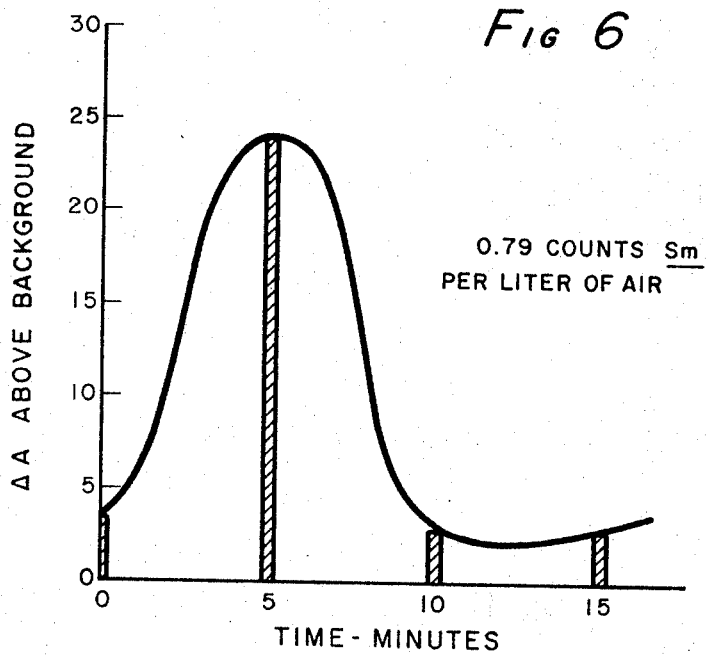

Reference is made to FIG. 6 wherein a bar graph illustrates the change in activity index at zero, five, ten and fifteen minute incubation periods of 0.79 Sm organisms per liter of air added to a "poised" enzyme-substrate system. The system included the enzyme alkaline phosphatase having a concentration of 0.0680 mg./ml., the incubation was performed at 37° C., and the system was "poised" to detect the smallest quantity of phosphatase by giving a maximum response in the shortest possible time. The activity units shown in the graph represent the difference between the activity of the "poised" system plus the microorganism sample and the activity of the "poised" system plus the background activity level of the collection liquid, which was the water mixture. FIG. 6 shows that the system was "poised" for maximum response to as few as 0.79 Sm organism per liter of air. The response was maximum in five minutes as shown by delta A of approximately 24 after a 5-minute incubation period.

Other experiments conducted in this manner indicate that as few as 0.5 organism per liter of air may be detected within 7 minutes from the time the organisms are introduced into the sampler.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. The method of rapidly detecting microorganisms by response to enzymes of such microorganisms, which comprises;

collecting a sample of microorganisms;

providing a "poised" enzyme-substrate system which comprises a given enzyme common to the microorganism of said sample and a selected substrate, said substrate and enzyme being mixed in predetermined concentrations to provide an equilibrium condition with respect to the production of an enzyme-substrate complex said condition being characterized by the production of minimum amounts of an end product;

adding at least a portion of said sample to said poised enzyme-substrate system to rapidly produce measurable amounts of said end product; and measuring the amount of end product produced to indicate the presence of said microorganisms.

2. The method of claim 1, wherein:

said given enzyme is a phosphate esterase.

3. The method of claim 1, wherein:

said given enzyme is alkaline phosphatase.

4. The method of claim 3, wherein:

said alkaline phosphatase is an alkaline phosphatase suspension in ammonium sulfate having a phosphatase concentration of between 0.0375 and 0.0575 mg./ml.

5. The method of claim 1, wherein:

said selected substrate comprises a given volume of disodium-phenyl-phosphate having a concentration of about 50 mg./ml. in 0.0745 mol borate buffer and a pH of about 9.6, and wherein said given enzyme comprises said given volume of alkaline phosphatase suspension in ammonium sulfate and having a phosphatase concentration of between 0.0375 and 0.0575 mg./ml.

6. The method of claim 5, wherein said step of measuring the amount of end product produced is performed by:

adding a selected amount of 2,6-dibromo-quinone-chloroimide to a container having therein said microorganism sample and enzyme-substrate system, and placing said container in a boiling water bath to rapidly develop blue indophenyl to indicate the presence of said microorganisms.

7. The method of claim 1, wherein:

said selected substrate is selected from the group consisting of para-nitro-phenyl-phosphate and disodium-phenyl-phosphate.

8. The method of "poising" a mixture of an enzyme and a substrate, which comprises the steps of:

providing a plurality of containers each holding the same quantity of a given substrate at a concentration which is in excess of that required to react with said enzyme;

providing a series of mixtures by adding to said containers equal quantities of said enzyme having different concentrations;

incubating said mixtures at constant temperature for a given period of time;

at the end of said period of time determining the amount of an end product produced by the action of said enzyme on said substrate;

determinig the range of those enzyme concentrations which produce substantially the same amounts of end product in said period of time; and mixing said substrate with said enzyme having a concentration within said range of concentrations to produce said "poised" enzyme-substrate system.

9. The method of claim 8, wherein:

said given substrate is selected from the group consisting of para-nitro-phenyl-phosphate and disodium-phenyl-phosphate, and said enzyme is alkaline phosphatase.

(References on following page)

References Cited

UNITED STATES PATENTS 2,359,052  9/1944  Scharer _____ 195—103.5

OTHER REFERENCES

Bayer et al.: The Enzymes, vol. 1, 2nd edition pp. 19, 20, 237, 238 (1959).

Dixon et al.: Enzymes, 2nd edition pp. 101–111 (1964).

ALVIN E. TANENHOLTZ, *Primary Examiner.*

U.S. Cl. X.R.

195—62, 101

UNITED STATES PATENT OFFICE
CERTIFICATE OF CORRECTION

Patent No. 3,451,893           Dated June 24, 1969

Inventor(s) R. G. SANDERS

It is certified that error appears in the above-identified patent and that said Letters Patent are hereby corrected as shown below:

In the specification, Column 4, Line 6, after the word substrate, insert --system--.

In the specification, Column 5, Line 14, after the word solution, insert --If the reaction is represented as follows:--.

SIGNED AND
SEALED

NOV 4 1969

(SEAL)
Attest:

Edward M. Fletcher, Jr.
Attesting Officer

WILLIAM E. SCHUYLER, JR.
Commissioner of Patents